March 12, 1957    J. A. RAJCHMAN    2,785,390

HYSTERETIC DEVICES

Filed April 28, 1955    2 Sheets-Sheet 1

INVENTOR.
JAN A. RAJCHMAN
BY Morris B. Rabkin
ATTORNEY

HYSTERETIC DEVICES

Filed April 28, 1955 2 Sheets-Sheet 2

INVENTOR.
JAN A. RAJCHMAN
BY Morris A. Rabkin
ATTORNEY

United States Patent Office 2,785,390

Patented Mar. 12, 1957

2,785,390

HYSTERETIC DEVICES

Jan A. Rajchman, Princeton, N. J., assignor to Radio Corporation of America, a corporation of Delaware Application April 28, 1955, Serial No. 504,562

23 Claims. (Cl. 340—174)

Figure 1:
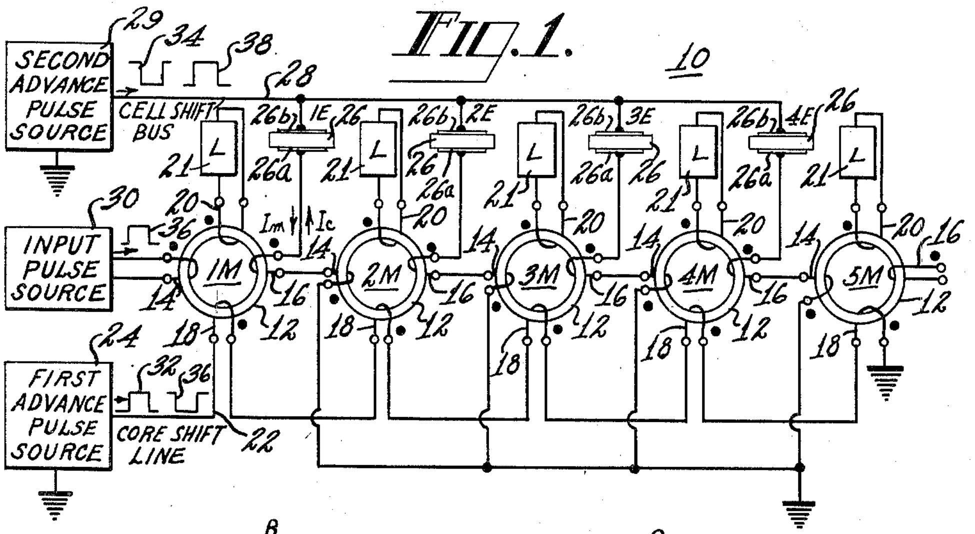

This invention relates to devices utilizing the hysteretic characteristics of magnetic and ferroelectric materials.

Storage, shifting and logical circuits using hysteretic devices, such as magnetic core elements, are known. These circuits generally employ a plurality of unilateral devices, such as diode rectifiers, in addition to the magnetic cores. The diode rectifiers serve to substantially block undesired interaction between the elements. Suitable diode rectifiers are relatively more expensive, and less reliable, than magnetic or ferroelectric elements. The relatively high impedance of a diode requires a correspondingly large number of turns to be used in the windings connected to the diodes in the case of magnetic cores especially. A large number of turns increases the fabrication cost and sets an upper limit to the operating speed.

It is an object of the present invention to provide novel devices using magnetic and ferroelectric elements.

Another object of this invention is to provide improved storage and shifting circuits employing magnetic and ferroelectric materials.

Still another object of the present invention is to provide magnetic core circuits which do not require the use of diode rectifiers.

A further object of the present invention is to provide novel storage and shifting circuits employing magnetic cores and ferroelectric cells wherein stored information can be propagated in both forward and reverse directions in accordance with the polarity of shift pulses.

A still further object of the present invention is to provide improved shift register circuits employing magnetic cores and ferroelectric cells in connection with a plurality of load devices.

A device, according to the invention, includes at least one magnetic core of rectangular loop magnetic material and at least one rectangular loop ferroelectric cell. A transfer winding linking the core is connected to one electrode of the cell. Information is represented by one of two directions of magnetization of the core and by one of two directions of polarization of the cell.

Further, according to another feature of the invention, a plurality of magnetic cores and ferroelectric cells are connected in cascade to form improved logical circuits including information storing and shifting circuits. These circuits may have appreciable loads coupled to the individual cores or cells, or both. The information may be shifted from a core to a cell, or vice versa, by applying suitable shift pulses to change the direction of magnetization of the core, or to change the direction of polarization of the cell. The output voltage induced across a transfer winding by the change of flux, when the direction of magnetization of the core is changed, is used to change the direction of polarization of a cell. The output current induced in a transfer winding by the change of direction of polarization of the cell is used to change the direction of magnetization of a core.

Figure 2A:
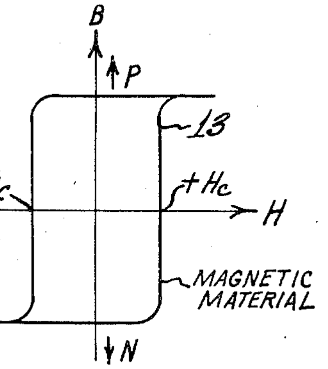
Figure 2B:
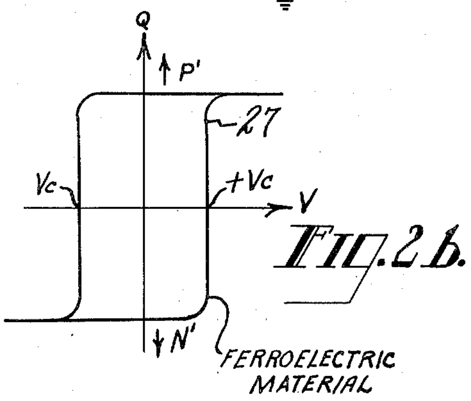
Figure 3:
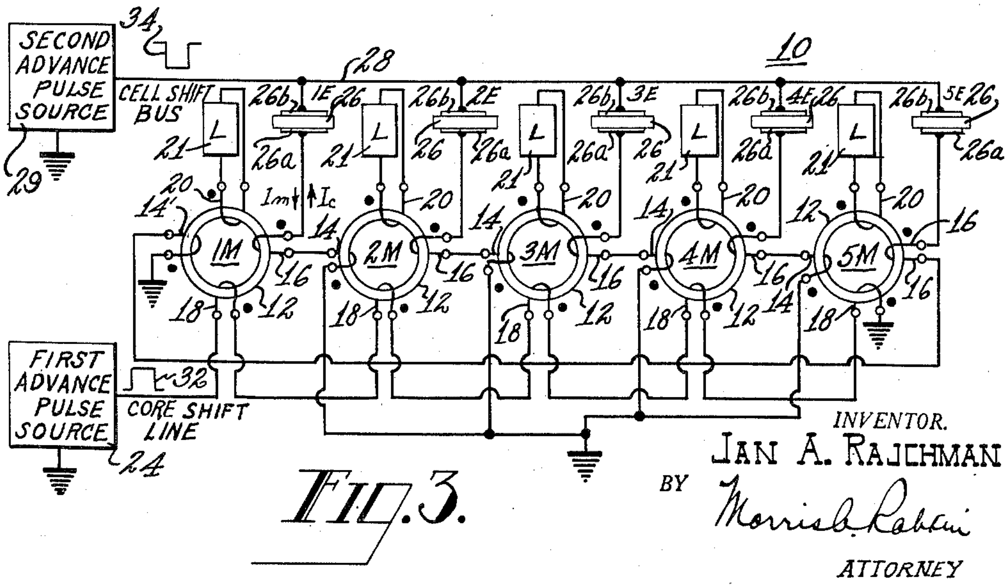
Figure 4:
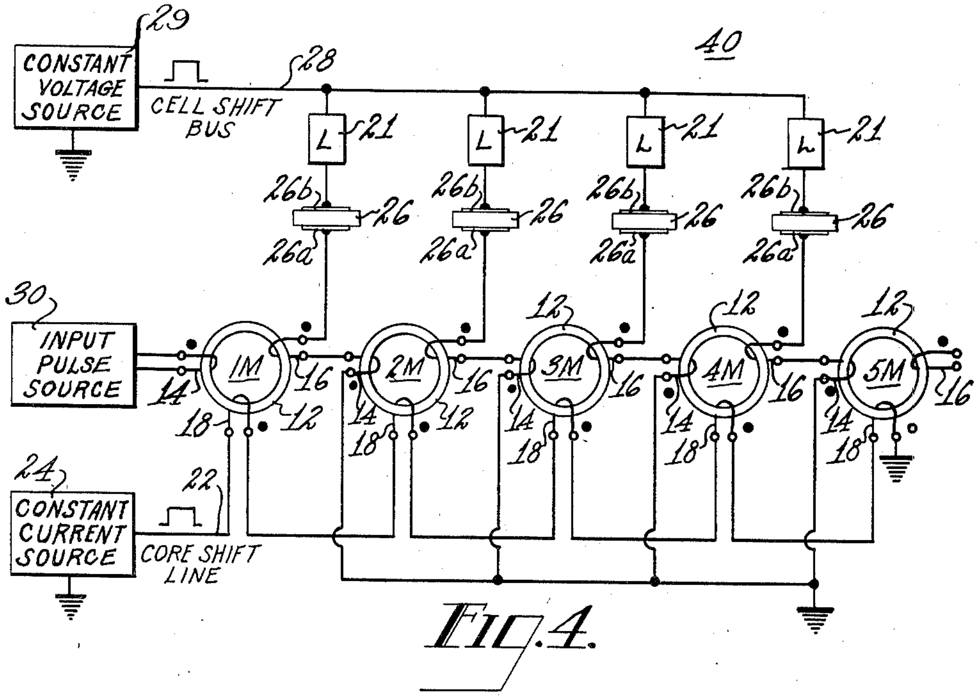
Figure 5:
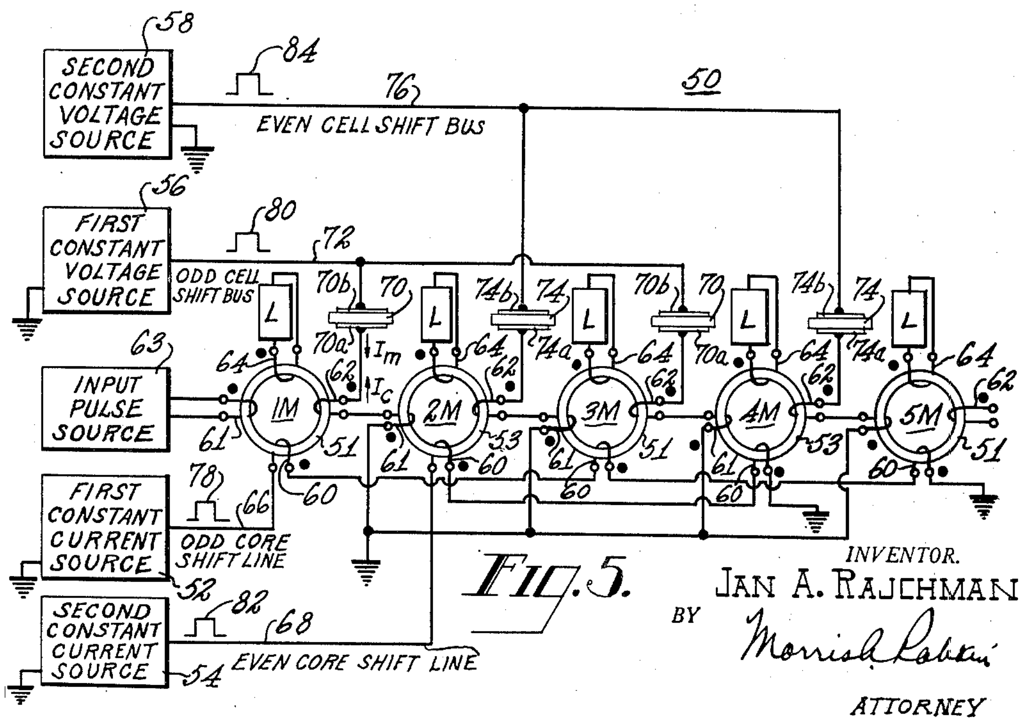

The invention will be more fully understood, both as to its organization and method of operation, from the following description when read in connection with the accompanying drawing, in which:

Fig. 1 is a schematic diagram of a shift register circuit according to the invention, Fig. 2*a* is a graph of an idealized rectangular hysteresis loop for a magnetic material, Fig. 2*b* is a graph of an idealized rectangular hysteresis loop for a ferroelectric material, Fig. 3 is a schematic diagram of a ring counter circuit according to the invention, Fig. 4 is a schematic diagram of a shift register circuit according to the present invention having a plurality of load devices, one connected in series with each ferroelectric cell, and Fig. 5 is a schematic diagram of a circuit according to the present invention which is useful in shifting patterns of binary signals.

Referring to Fig. 1, a shift register 10 is illustratively provided with five stages, 1M through 5M, each stage having a magnetic core 12. Each of the cores 12 is fabricated from a magnetic material characterized by a substantially rectangular hysteresis loop. Certain materials, such as molybdenum-permalloy and manganese-magnesium ferrite, exhibit the desired rectangular loop. A hysteresis loop 13, somewhat idealized, for a magnetic material of rectangular characteristic is shown in Fig. 2*a*. Each core has two remanent conditions of magnetic induction (B) or magnetization in which the core exhibits substantial flux saturation. One remanent condition corresponds to a flux substantially oriented in one direction, and the other condition corresponds to flux substantially oriented in the opposite direction. In a toroidal core, for example, these directions may be taken circumferentially around the axis of revolution of the toroid along its mean radius. The one direction of magnetization is arbitrarily designated the "P" direction and the other direction of magnetization is designated the "N" direction. Substantially no flux change is produced when a core is driven further into saturation along a horizontal portion of the hysteresis loop. A positive magnetizing force, greater than a coercive force $+Hc$, as indicated by the graph of Fig. 2*a*, is required to change the magnetization of the core from the N direction to the P direction. Similarly, a negative magnetization force, greater than a coercive force $-Hc$, is required to change a core from the P to the N direction.

Referring again to Fig. 1, each core 12 is linked by an input winding 14, an output winding 16, an advance winding 18 and a load winding 20. A core shift line 22 connects each of the advance windings 18 in series by connecting the dot-marked terminal of one winding to the unmarked terminal of the next succeeding winding. (These marks are conventional in the transformer art, and are more fully explained hereinafter.) One terminal of the core shift line 22 is connected to a first advance pulse source 24 and the other terminal of the shift line 22 is connected to a common ground, indicated by the conventional ground symbol.

The marked terminal of the output winding of a core is connected to one electrode 26*a* of a corresponding ferroelectric cell 26. The other electrode 26*b* of each of the ferroelectric cells 26 is connected in parallel with a second advance pulse source 29 by means of a shift bus 28. The unmarked terminal of the output windings of each core 12 is connected to the unmarked terminal of the input winding 14 of the next succeeding core 12. The marked terminal of each of the input windings 14, excepting that of the core 12 of the first stage, is connected to the common ground. The input winding 14 of the core 12 of the first stage is connected to an input pulse source 30. A plurality of load devices 21 are individually connected across the output windings 20 of the respective cores 12.

A hysteresis loop 27, also somewhat idealized, plotting charge against applied voltage, for a rectangular ferroelectric material is shown in Fig. 2*b*. Certain materials, such as barium titanate, exhibit a rectangular hysteresis characteristic. Each cell 26 has two remanent conditions of electric charge (Q) or polarization in which the cell exhibits substantial charge saturation. One remanent condition corresponds to that produced by the voltage V of one sense in which a current flows in one direction. This current flow may be considered out of one of the two cell electrodes. The other condition corresponds to that produced by a voltage of the opposite sense, in which a current flows in the other direction, into the same one electrode. In Fig. 1, for example, the one electrode may be the electrode **26*a***. The one direction of polarization is arbitrarily designated the P′ direction and the other direction of polarization is designated the N′ direction. Substantially no change of charge is produced when a cell is driven further into charge saturation along a horizontal portion of the hysteresis loop by a voltage V. A voltage of one polarity in excess of a coercive voltage $+V_c$ is required to change the polarization of a cell from the N′ to the P′ direction. Likewise, a voltage of the other polarity in excess of a coercive voltage $-V_c$ is required to change a cell back to the N′ direction.

In Fig. 1, the relative sense of linkage of the windings to a core is indicated on the drawing by a dot adjacent the winding terminals in accordance with the usual transformer convention. Thus, a positive current (taken in the conventional sense of current flow) flowing into a dot-marked terminal of a winding produces a change of flux in one direction, taken herein as the P direction, in the linked core; positive current flowing into an unmarked terminal of a winding produces a change of flux in the opposite direction, the N direction in the core. A negative current produces a change of flux opposite that produced by a positive current. Conversely, a change of flux in a core from one direction P to the other direction N induces a voltage in a winding coupled thereto. The polarity of this induced voltage is then such that the marked terminal of a winding is negative relative to its unmarked terminal; and for a flux change from the N direction to the P direction, the polarity of the induced voltage is reversed.

First consider the operation of the shift register 10 with each of the cores 12 magnetized in the N direction and each of the cells 26 polarized in the N′ direction. A positive current pluse 32 applied to the shift line 22 by the first advance pulse source 24 generates a magnetizing force in each of the cores 12 which tends to drive these cores further into saturation in the N direction. Thus, substantially no flux change is produced in any of the cores and substantially no output voltage is induced across the terminals of the output windings 16. A negative voltage pulse 34 applied to the shift bus 28 by the second advance pulse source 29 produces an electric field across each of the cells 26 which drives the cells further into saturation in the N′ direction. Therefore, substantially no current flows into any one electrode **26*a* and the magnetization of the coupled cores 12** is substantially unaffected.

Assume, now, that the input pulse source 30 is activated and furnishes a positive input pulse 36 into the marked terminal of the input winding 14 of the core 12 of the stage 1M. The first core 12 is driven from the N to the P direction of magnetization by the pulse 36. The P direction may represent, for example, a binary one. The flux change in the first core 12 produces a voltage making the marked terminal of its output winding 16 more positive than the unmarked terminal. This output voltage tends to drive the first coupled cell 26 further into saturation in the N′ direction. Consequently, the cell 26 blocks current flow in the direction $I_c$ and neither the magnetization of the second core 12, nor the polarization of the first cell 26 is changed when the binary one is written into the first core 12. Any current flow in the shift line 22 caused by the flux change in the core 12 of the stage 1M is in a direction to drive the other cores 12 further into saturation in the N direction. Thus, the input pulse 36 affects only the core 12 of the stage 1M.

Now, when the first advance pulse source 24 is activated, the positive advance current pulse 32 drives the first core 12 from the P to the N direction of magnetization. The output voltage induced in the first core output winding 16 makes the marked terminal of its output winding 16 more negative than the unmarked terminal. A current $I_m$ flows in the transfer link including the first cell 26, the output winding 16 of the stage 1M core 12 and the input winding of the stage 2M core 12. Accordingly, a relatively large change of charge is produced in the first cell 26, and this cell is driven from the N′ to the P′ direction of polarization. The current $I_m$ flows into the unmarked terminal of the input winding 14 of the stage 2M core 12. Therefore, this core 12 is driven further into saturation in the N direction and very little change of flux is produced. The binary one stored in the first core, therefore, is transferred to the first cell 26 by the advance pulse 32. Practically all the voltage induced across the terminals of the output winding 16 of the stage 1M core 12 appears across the first cell 26.

Now, when the second advance pulse source 29 is activated, a negative advance voltage pulse 34 drives the first cell 26 from the P′ to the N′ direction of charge saturation, thereby producing a relatively large current $I_c$ which flows in the transfer link of the stages 1M and 2M.

The current $I_c$ flowing into and through the marked terminal of the input winding 14 of the stage 2M core 12 drives this core from the N to the P direction of magnetization. The stage 1M core 12 is driven further into saturation in the N direction by the current $I_c$ flowing into the unmarked terminal of its output winding 16. Therefore, substantially no flux change is produced in the stage 1M core 12 by the current $I_c$. Thus, the second advance pulse 34 transfers the binary one from the first cell 26 to the stage 2M core 12. In like manner, the voltage induced in the output winding 16 of the stage 2M core 12 is blocked by the second cell 26 from producing any appreciable current. Thus the transfer link coupling the cores 12 of the stages 2M and 3M is effectively open-circuited to any current flow.

The stored information can be transferred from the stage 2M core 12 to the second cell 26 by applying another advance pulse 32 to the shift line 22. Similarly, the information stored in the second cell 26 can be transferred to the stage 3M core 12 by applying another advance pulse to the shift bus 28. Thus, the information initially stored in the stage 1M core 12 is shifted down the line from core to cell to core by first applying a current pulse 32 to the shift line 22 and then applying a voltage pulse 34 to the shift bus 28.

The shift register 10 is illustrated as an open-ended shift register. After a predetermined number of advance pulses, the information initially stored in the stage 1M core 12 is read out of the stage 5M core 12. After the information is read out of the stage 5M, the register is in its initial condition with each of the cores 12 magnetized in the N direction and each of the cells polarized in the N′ direction.

The shift register 10 can be used as a ring counter circuit by providing a fifth transfer link as shown in Fig. 3. The fifth transfer link includes a fifth ferroelectric cell 26, having its electrode **26*a* connected to the marked terminal of the output winding 16 of the core 12 of the last stage 5M. The other electrode 26*b* of the cell 26 is connected to the shift bus 28. The unmarked terminal of the output winding 16 of the stage 5M core 12 is connected to the unmarked terminal of an input winding 14′ of the core 12 of the first stage 1M. A binary one is cycled through the counter as described for the circuit of Fig. 1. When a binary one is read out of the core 12 of the last stage 5M of the ring counter it is first transferred to the fifth cell 26** and is then transferred back to the first stage 1M. The number of stages in the ring counter may be either odd or even as desired. The counter can be reset, for example, by applying a reset current to a reset winding (not shown) linking the core 12 of the stage 1M in one sense and the remaining cores 12 in the opposite sense and at the same time applying a reset voltage to each of the cells 26.

Information represented by the direction N of a core and the direction N′ of a cell can be propagated in the forward direction, by reversing the polarity of the shift pulses. For example, assume that the shift register of Fig. 1 is reset with each core 12 magnetized in the P direction, excepting the stage 1M core 12; and with all the ferroelectric cells 26 polarized in the P′ direction. The N direction of magnetization and the N′ direction of polarization may now represent a binary one.

A negative shift pulse 36 applied to the shift bus 22 drives the stage 1M core 12 from the N to the P direction of magnetization. The voltage induced across the terminals of the output winding 16 of the driven core 12 causes a current Ic to flow in the first transfer link, and changes the polarization of the first cell 26 from the P′ to the N′ direction. The current Ic flowing into the marked terminal of the input winding 14 of the stage 2M core 12 is in a direction to drive this core further into saturation in the P direction. Thus, only the direction of magnetization of the stage 1M core 12 is changed by the negative current pulse 36. A positive voltage pulse 38 applied to the shift bus 28 changes the polarization of the first cell 26 back to the P′ direction and causes a current Im to flow in the first transfer link. The current Im flowing into the unmarked terminal of the stage 2M core 12 reverses its direction of magnetization to the N direction.

By alternatingly applying negative current pulses 36 and positive voltage pulses 38 the binary one is shifted down the line. The output voltage induced across the terminals of a load winding 20 is the reverse of that produced when a binary one is represented by the directions P and P′ as described for the previous example.

Stored information can be propagated in a reverse direction, from a higher order to a lower order stage, by assigning different directions for representing stored information in the cores and cells, and by reversing the polarity of one of the shift pulses.

For example, assume that it is desired to shift information from a higher order stage 2M to a lower stage 1M. Also, assume that the stage 2M core 12 is magnetized to the N direction, that each of the remaining cores 12 is magnetized to the P direction, and that each of the cells 26 is polarized in the N′ direction. A binary one may now be represented by the N direction of magnetization of a core 12 and by the P′ direction of a cell 26.

A negative advance pulse 36 applied to the shift line 22 changes the direction of magnetization of the stage 2M core 12 from the N to the P direction, and drives each of the remaining cores 12 further into saturation in the P direction. A voltage is induced across the terminals of the input (now output) winding 14 of the stage 2M core 12 making its unmarked terminal more negative than its marked terminal. This voltage causes a current Im to flow in the transfer link including the first cell 26 and the output (now input) winding 16 of the stage 1M core 12, and drives the first cell 26 from the N′ to the P′ direction of polarization. The current Im flowing into the marked terminal of the winding 16 of the stage 1M core 12 drives this core further into saturation in the P direction.

The following negative advance pulse 34 applied to the shift bus 28 drives the first cell 26 from the P′ to the N′ direction of polarization, thereby causing the current Ic to flow in the transfer link coupling the cores 12 of the stages 1M and 2M. The current Ic flowing into the unmarked terminal of the winding 16 of the first core 12 drives the stage 1M core 12 from the P to the N direction of magnetization. The current Ic flowing into the marked terminal of the winding 14 of the stage 2M core 12 drives this core further into saturation in the P direction. Thus, the information stored in the stage 2M core 12 is transferred to the first cell 26 by the advance pulse 36; and transferred from the first cell 26 to the stage 1M core 12 by the advance pulse 38.

Information represented by the direction N of the cores 12 and the direction P′ of the cells 26 can be propagated in the reverse direction by reversing the polarity of the current pulse applied to the shift line 22. Thus, a core 12 magnetized in the N direction is driven to the P direction by a negative current pulse 36. When a core is thus driven the adjacent cell 26 included in the transfer link coupling the core 12 of the next lower order stage is driven to the P′ direction of polarization. A negative voltage pulse 38 applied to shift bus 28 returns the driven cell 26 to the P′ direction and changes the magnetization of the core 12 of the next lower order stage to the N direction; and so on for alternate negative polarity current and voltage pulses. Table I below correlates the propagation direction, the directions of magnetization and polarization, and the polarities of the shift pulses for the above described cases.

*Table I*

| | Propagation Direction | Initial Cond. of— | | Polarity Current pulse | Polarity Voltage pulse |
|---|---|---|---|---|---|
| | | Cores | Cells | | |
| Case 1 | Forward | In N<br>1 in P | all in N′ | positive | negative. |
| Case 2 | Forward | In P<br>1 in N | all in P′ | negative | positive. |
| Case 3 | Backward | In N<br>1 in P | all in P′ | positive | positive. |
| Case 4 | Backward | In P<br>1 in N | all in N′ | negative | negative. |

In shifting information from a core to a cell, the output voltage induced in the core winding must be greater than the coercive voltage of the ferroelectric cell connected in the transfer link. This core output voltage depends upon the number of turns of the core winding and on the amplitude and rise time of the current pulse applied to the shift line 22. Similarly, for a given number of turns linking a core, the current flow produced in a transfer link must be sufficient to cause a magnetizing force greater than the coercive force of the core. The amount of transfer current depends at least in part upon the amplitude and rise time of the advance pulses applied to the shift bus 28. A given number of turns in an output winding 16 and in an input winding 14, sets a limit on the minimum amplitude and the maximum rise time of the advance pulses. Conversely, for advance pulse sources of given characteristics, the minimum number of turns required in an output winding 16 and in an input winding 14 is fixed. It is desirable to provide for the first advance pulse source 24 one having a constant current characteristic; and for the second advance pulse source 29 one having a constant voltage characteristic. Suitable known constant current sources include other magnetic cores and pentode-type vacuum tubes.

Suitable known constant voltage sources include cathode follower circuits. A linear transformer may be connected in the cathode circuit of a cathode follower to provide additional current amplification. A cathode follower circuit provides the desired low impedance to ground in the Im current direction.

Also during the switching of a core from one to the other direction of magnetization, the impedance between the second pulse source 29 and ground is preferably made low in the direction of a current flow Im in a transfer link. By furnishing a low impedance in the Im current direction substantially all the voltage drop appears at the desired time across the ferroelectric cell.

The advance pulses may be provided with very large amplitude and be of very short durations. The maximum amplitude and the minimum duration is limited by the switching characteristics of the cores and cells if they are to be driven to saturation thereby. Substantially all the energy of the advance pulses is delivered to the stage being switched. Only the energy required to drive the non-switched elements further into saturation is dissipated in the non-switched stages. If the hysteretic materials exhibited perfectly rectangular hysteresis characteristics, there would be practically no energy dissipated in the non-switched stages. Losses, therefore, are substantially only those due to the departure of the elements from rectangularity and the losses in driving the desired elements or cores.

Each time the direction of magnetization of a core is switched, a voltage is induced in the output winding 20 linking the core. This voltage is delivered across the load 21 of the switched core. Very heavy power can be delivered to a load 21 by employing large amplitude and fast rise time advance pulses. A voltage is induced across the load winding 20 both by the current pulse applied to the shift line 22 and the voltage pulse applied to the shift bus 28. The polarity of the load voltage resulting from the current pulse applied to the shift line 22 is opposite that resulting from the voltage pulse applied to the shift bus 28. With a load having a relatively small impedance, a substantial portion of the power contained in an advance pulse is delivered to the load. The relatively high ratio between the power applied and the power delivered is due to the small amount of power required to change the direction of magnetization of the core 12 and to change the direction of polarization of a cell 26. A relatively high efficiency of power transfer from an advance pulse on the shift bus 28 to a load 21 can be obtained by providing the input windings 14 with a large number of turns.

If desired, most of the power transfer can be made on a selected one of the advance pulses. In such case, the selected advance pulse would be made to have a rise time which is much faster, say five times faster, than that of the other, non-selected pulse.

The individual loads 21 may also be placed one in each transfer link by connecting one terminal of a load 21 to the electrode 26*b* of a cell 26, and the other terminal of the load 21 to the shift bus 28. Such a load connection is shown in Fig. 4 for a shift register 40. The shift register 40 is similar to the shift register 10 of Fig. 1 with the exception of the manner of connecting the loads 21. Like parts have been given like reference numbers. The amplitude and rise time of the current pulses applied to the shift line 22 are adjusted to provide sufficient voltage on the output winding 16 of the switched core 12 both to switch the cell 26 of a transfer link and to supply a voltage to the coupled load 21. Also, it is assumed that the cores have a sufficiently large cross-sectional area to supply the increased voltage required by the load 21. Similarly, the voltage pulses applied to the shift bus 28 are also of sufficient amplitude and rise time to supply the load voltage, the coercive voltage for the driven cell and the coercive force for the switched core.

Referring to Fig. 5, there is shown a shift register 50 for shifting a pattern of information. The register 50 has associated therewith first and second current sources 52 and 54 and first and second voltage sources 56 and 58. The sources 52 and 54 preferably have constant current characteristics, and the sources 56 and 58 preferably have constant voltage characteristics. Each of the odd-stage cores 51 and each of the even-stage cores 53 is linked by an advance winding 60, an input winding 61, an output winding 62 and a load winding 64. An odd core shift line 66 connects each advance winding 60 of the odd cores 51 in series with each other. One terminal of the shift line 66 is connected to the first current source 52 and the other terminal of the shift line 66 is connected to a common ground. An even core shift line 68 connects each advance winding 60 of the even cores 53 in series with one another. One terminal of the shift line 68 is connected to the second current source 54 and the other terminal of the shift line 68 is connected to ground.

A transfer link between the output winding 62 of an odd core 51 and the input winding 61 of a succeeding even core 53 is formed by connecting one terminal 70*a* of a ferroeleceric cell 70 to the marked terminal of the output winding 62 of a corresponding odd core 51, and connecting the unmarked terminal of the output winding 62 of that core 51 to the unmarked terminal of the input winding 61 of a succeeding even core 53. The marked terminal of each input winding 61, excepting that of the stage 1M core 51, is connected to ground; the terminals of the stage 1M input winding 61 are connected to an input pulse source 63.

The other terminal 70*b* of each cell 70 is connected in parallel to an odd cell shift bus 72. The shift bus 72 is connected to the first voltage source 56. Each even core 53 is linked to each succeeding odd core 51 by connecting one electrode 74*a* of a cell 74 to the marked terminal of an output winding 62 of a corresponding even core 53 and connecting the unmarked terminal of that winding 62 to the unmarked terminal of the input winding 61 of the next odd core 51. The other electrode 74*b* of each even cell 74 is connected in parallel to an even cell shift bus 76. The shift bus 76 is connected to the second voltage source 58.

In operation, assume that the register 50 is reset with all the cells polarized in the N′ direction, all the even cores 53 magnetized in the N direction, and all the odd cores 51 magnetized in the P direction. When the first advance pulse 78 is applied by the first constant current source 52 to the odd core shift line 66, each odd core is driven from the P to the N direction of magnetization. The voltage across the terminals of the output windings 62 of the odd cores 51 causes a current $I_m$ to flow in each odd transfer link, and drives each odd cell 70 from the N′ to the P′ direction of polarization. None of the even cores 53 is switched by the current $I_m$ flowing into the unmarked terminal of its input winding 61.

The first voltage pulse 80 from the first constant voltage source 56 changes each odd cell 70 from the P′ to the N′ direction of polarization and produces the current $I_c$ in each even transfer link. The current $I_c$ flowing into the marked terminal of the input winding 61 of an even core 53 drives the respective even cores to the P direction of magnetization.

The next advance pulse 82 applied to the even core shift line 68 by the second constant current source 54 transfers the information from the respective even cores 53 to the connected even cells 74 in a similar manner. The next advance pulse 84 applied to the even cell shift bus 76 by the second constant voltage source 58 transfers the information stored in each even cell 74 to the connected odd core 51. Thus, the pattern of information is shifted from the odd cores 51 to the odd cells 70; and from the odd cells 70 to the even cores 53, and so on for pairs of odd and even shift pulses.

The pattern of information shifted down the line can be completely arbitrary. That is the odd cores 51 can be magnetized in the P and N directions of magnetization according to some arbitrary pattern. Thus, when an odd core 51 is initially magnetized in the N direction, the connected even cell 74 is unchanged by the advance pulse 78 applied to the odd core shift line 66. Similarly, the next even core 53 connected to an unchanged even cell 70 is unaffected by the odd cell shift pulse 80, and so on down the line.

Certain pulse patterns can be shifted in a shift register having only one shift line and one shift bus. For example, referring to Fig. 1, assume that odd ones of the cores 12 are magnetized in the P direction and the even ones of the cores 12 are magnetized in the N direction. Also, assume that each of the cells 26 is polarized in the N' direction. The first advance pulse 32 applied to the shift line 22 transfers the information stored in the odd cores 12 to the odd ferroelectric cells 26. All even cores 12 are unchanged by the shift pulse 32 because any current in their windings resulting from the shift pulse 32 is in a direction to magnetize them further into saturation in the N direction. Consequently, the even cores 12 remain magnetized in the N direction. The next pulse 34 applied to the shift bus 28 transfers the pattern of information from the odd cells 26 to the even cores 12. Again there is substantially no undesired interaction produced.

Certain other patterns than the one described may be shifted by using a shift register such as the register 10.

There has been described herein novel devices employing magnetic and ferroelectric materials having substantially rectangular hysteresis characteristics. The ferroelectric cells may be ferroelectric condensers having a dielectric of ferroelectric material which exhibits the desired rectangular hysteresis characteristics. The novel combinations of rectangular-loop magnetic cores and rectangular-loop ferroelectric cells provide simplified storing, switching and logical circuits. No unilateral conduction devices are required for preventing undesired interaction between the elements. The circuits of the present invention provide the desirable characteristics of fast operation because shift pulses having a fast rise time and a short duration may be used. The circuits of the present invention also provide advantageous means for driving a plurality of load devices in accordance with stored information. Shift registers according to the present invention may be used for shifting a single pulse in synchronism with each advance pulse, as employed in known ring counter circuits. The ring counter circuit may be open-ended as is desirable in certain synchronized operations where timing begins with a specified event producing an input pulse; or the ring counter circuits may be closed with the output of the last stage fed back to the input of the first stage.

Arbitrary patterns of information can also be shifted by means of the present invention. Such pattern shifting is desirable, for example, in digital computing where arithmetic operations are carried out. When information is inserted into a core or cell the input pulse source is substantially decoupled from other cores and cells. Only the core or cell connected to the input pulse source is affected by the input pulse. If desired, the information may be initially stored in the ferroelectric cells. Stored information can be propagated in a forward or a reverse direction.

What is claimed is:

1. The combination comprising a magnetic core characterized by having two remanent conditions of substantial flux saturation and having a winding linked thereto, and a ferroelectric cell connected to said winding, said cell being characterized by having two remanent conditions of substantial charge saturation.

2. The combination comprising a magnetic core element and a ferroelectric element each characterized by having a substantially rectangular hysteresis loop, said magnetic core element having a winding to which said ferroelectric element is serially connected.

3. In combination with a plurality of magnetic cores, a plurality of transfer links connecting said cores in cascade, each said transfer link including a different ferroelectric cell, said cores and said cells each exhibiting a substantially rectangular hysteresis loop.

4. In combination with a plurailty of magnetic cores, a plurality of ferroelectric cells, a plurality of transfer links connecting said cores and said cells in cascade, each of said cores and each of said cells exhibiting a substantially rectangular hysteresis loop, and a plurality of load windings, a different one of said load windings being linked to each of said cores.

5. In combination with a plurality of magnetic cores, a plurality of ferroelectric cells, a plurality of transfer links connecting said cores and said cells alternately in cascade, each of said cores and each of said cells exhibiting a substantially rectangular hysteresis loop, and a plurality of load devices, a different one of said load devices being connected in each of said transfer links.

6. A device comprising first and second ferroelectric cells, a pair of transfer links, each connected to a different one of said cells, and means including a magnetic core interconnected in said transfer links for selectively transferring a signal from said first to said second cell.

7. A storage device comprising first and second magnetic cores, means including an input winding linking said first core for storing information therein, advance and output windings linking said first core, an input winding linking said second core, and means including a ferroelectric cell connecting said output winding of said first core and said input winding of said second core.

8. A storage device comprising first and second magnetic cores, means including an input winding linking said first core for storing information therein, advance and output windings linking said first core, an input winding linking said second core, means including a ferroelectric cell connecting said output winding of said first core and said input winding of said second core, means for applying a current to said advance winding for transferring the stored information from said first core to said ferroelectric cell, and means for applying a voltage across said ferroelectric cell for further transferring the stored information to said second core.

9. A storage device comprising first and second magnetic cores, means for storing information in said cores, a pair of shift windings each linked to a different one of said cores, means including a ferroelectric cell and windings linking said first and second cores for selectively transferring stored information either from said first core to said second core, or from said second core to said first core.

10. A storage device comprising a plurality of magnetic cores each having an advance winding, a plurality of transfer links each coupled to different ones of said cores and each including a ferroelectric cell, a shift line connected to each of said advance windings, a shift bus connected to each of said ferroelectric cells, means for applying a pulse to said shift line for transferring information from said cores to said cells, and means for applying a pulse to said shift bus for transferring information from said cells to said cores.

11. A storage device comprising a plurality of magnetic cores each having an advance winding, a plurality of transfer links each coupled to different ones of said cores and each including a ferroelectric cell, a shift line connected to each of said advance windings for receiving a pulse for transferring information from said cores to said cells, and a shift bus connected to each of said ferroelectric cells for receiving a pulse for transferring information from said cells to said cores.

12. A shift register comprising a plurality of magnetic cores, each characterized by having a substantially rectangular hysteresis loop, a plurality of ferroelectric cells, each characterized by having a substantially rectangular hysteresis loop, a plurality of transfer links, each including one of said ferroelectric cells and each linking a different pair of said cores, a shift bus, means connecting each of said ferroelectric cells to said shift bus, a shift line linking each of said cores, and means for applying a positive polarity pulse to said shift bus and a negative polarity pulse to said shift line.

13. A shift register comprising a plurality of magnetic cores, each characterized by having a substantially rectangular hysteresis loop, a plurality of ferroelectric cells, each characterized by having a substantially rectangular hysteresis loop, a plurality of ferroelectric cells, each characterized by having a substantially rectangular hysteresis loop, a plurality of transfer links, each including one of said ferroelectric cells and each linking a different pair of said cores, a shift bus, means connecting each of said ferroelectric cells to said shift bus, a shift line linking each of said cores, and means for applying a negative polarity pulse to said shift bus and a positive polarity pulse to said shift line.

14. A shift register comprising a plurality of magnetic cores, each characterized by having a substantially rectangular hysteresis loop, a plurality of ferroelectric cells, each characterized by having a substantially rectangular hysteresis loop, a plurality of transfer links, each including one of said ferroelectric cells and each linking a different pair of said cores, a shift bus, means connecting each said ferroelectric cell to said shift bus, a shift line linking each of said cores, and means for applying a positive polarity pulse to said shift bus and a positive polarity pulse to said shift line.

15. A shift register comprising a plurality of magnetic cores, each characterized by having a substantially rectangular hysteresis loop, a plurality of ferroelectric cells, each characterized by having a substantially rectangular hysteresis loop, a plurality of transfer links, each including one of said ferroelectric cells and each linking a different pair of said cores, a shift bus, means connecting each said ferroelectric cell to said shift bus, a shift line linking each of said cores, and means for applying a negative polarity pulse to said shift bus and a negative polarity pulse to said shift line.

16. A shift register comprising a plurality of magnetic cores, each characterized by having a substantially rectangular hysteresis loop, a plurality of ferroelectric cells, each characterized by having a substantially rectangular hysteresis loop, a plurality of transfer links, each including one of said ferroelectric cells and each linking adjacent pairs of said cores, a shift bus, means connecting each said ferroelectric cell to said shift bus, a shift line linking each of said cores, and means for applying a pulse of one polarity to said shift bus and a pulse of the opposite polarity to said shift line.

17. A device for shifting a pattern of information signals comprising a first plurality of magnetic cores, a second plurality of magnetic cores, each of said cores being characterized by having a substantially rectangular hysteresis loop, a first plurality of ferroelectric cells, a second plurality of ferroelectric cells, each of said cells being characterized by having a substantially rectangular hysteresis loop, first and second pluralities of transfer links each linking different ones of said first and second pluralities of magnetic cores, means connecting an individual one of said first plurality of ferroelectric cells in each said first transfer link, means connecting an individual one of said second plurality of magnetic cores in each said second transfer link, first and second shift busses, means connecting each of said first plurality of ferroelectric cells to said first shift bus, means connecting each of said second plurality of ferroelectric cells to said second shift bus, and first and second shift lines, said first shift line linking each of said first plurality of magnetic cores, and said second shift line linking each of said second plurality of magnetic cores.

18. A device for shifting a pattern of information signals comprising a first plurality of magnetic cores, a second plurality of magnetic cores, each of said cores being characterized by having a substantially rectangular hysteresis loop, a first plurality of ferroelectric cells, a second plurality of ferroelectric cells, each of said cells being characterized by having a substantially rectangular hysteresis loop, first and second pluralities of transfer links each linking different ones of said first and second pluralities of magnetic cores, means connecting an individual one of said first plurality of ferroelectric cells in each of said first transfer links, and means connecting an individual one of said second plurality of ferroelectric cells in each of said second transfer links.

19. A device comprising a plurality of magnetic cores, each characterized by having a substantially rectangular hysteresis loop, a plurality of ferroelectric cells, each characterized by having a substantially rectangular hysteresis loop, a plurality of transfer links each including one of said ferroelectric cells and each linking different ones of said cores, first and second shift busses, means connecting certain ones of said transfer links to said first shift bus, and means connecting the remaining ones of said transfer links to said second shift bus.

20. A device comprising a plurality of magnetic cores, each characterized by having a substantially rectangular hysteresis loop, a plurality of ferroelectric cells, each characterized by having a substantially rectangular hysteresis loop, a plurality of transfer links each including one of said ferroelectric cells and each linking different ones of said cores, first and second shift busses, means connecting certain ones of said transfer links to said first shift bus, means connecting the remaining ones of said tranfer links to said second shift bus, and first and second shift lines, said first shift line linking certain ones of said cores, and said second shift line linking the remaining ones of said cores.

21. A ring counter comprising a plurality of magnetic cores each characterized by having appreciable remanence, a plurality of ferroelectric condensers each having a dielectric of ferroelectric material, and a plurality of transfer links connecting said cores and condensers in cascade and including a transfer link connecting the highest order magnetic core and the lowest order magnetic core.

22. A device comprising, in combination, a core of magnetic material capable of assuming one or the other of two states of remanence and constituting a first element, a ferroelectric cell also capable of assuming one or the other of two states of remanence and constituting a second element, and means coupled to each of said elements for effecting a change of state in one of said elements in response to a change of state of the other of said elements.

23. A device comprising, in combination, a core of magnetic material capable of assuming one or the other of two states of remanence and constituting a first element, a ferroelectric cell also capable of assuming one or the other of two states of remanence and constituting a second element, and means for deriving from one of said elements, in response to a change of state thereof, a signal for effecting a change of state of the other of said elements.

No references cited.